W. H. ANDERSON.
CINEMATOGRAPH MACHINE.
APPLICATION FILED SEPT. 11, 1914.

1,168,992.

Patented Jan. 18, 1916.
3 SHEETS—SHEET 1.

WITNESSES
B. A. Hanway
S. K. Miskell

INVENTOR
Walter Hillier Anderson
BY
Mason Fenwick & Lawrence
ATTORNEYS

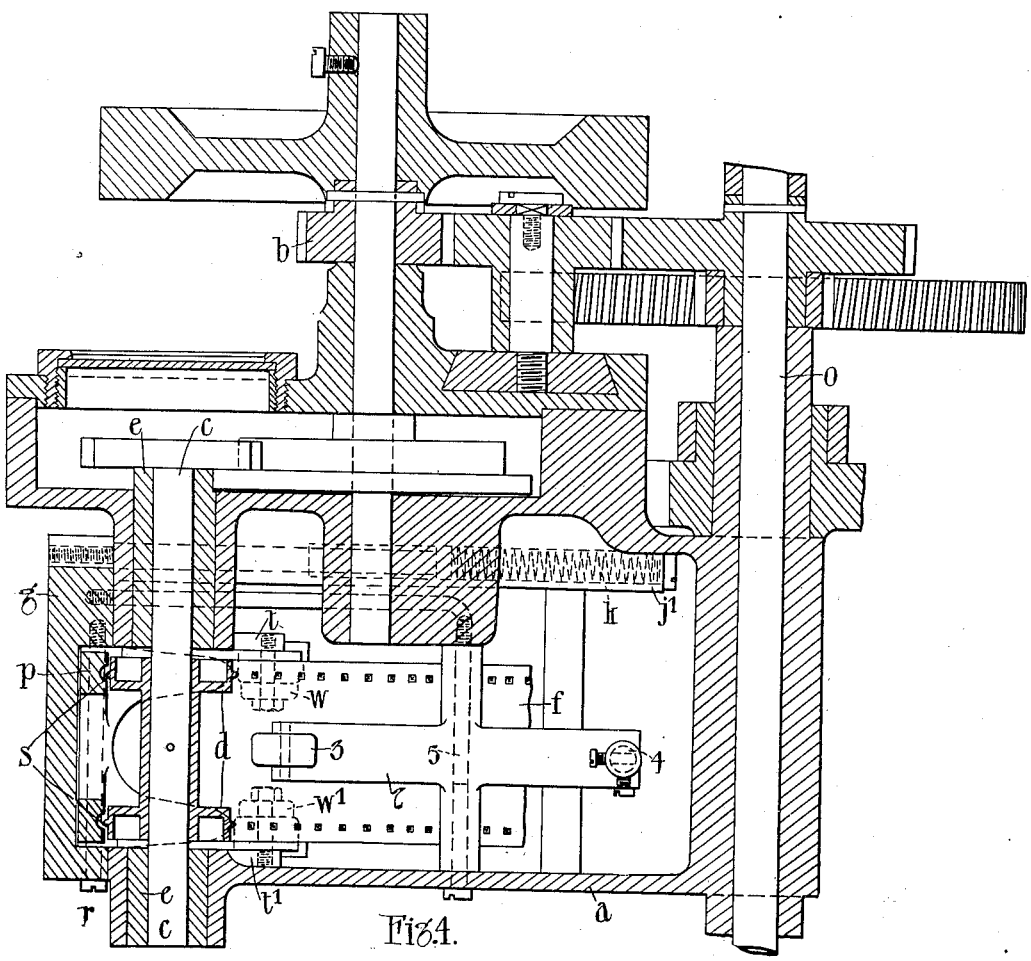

UNITED STATES PATENT OFFICE.

WALTER HILLIER ANDERSON, OF LONDON, ENGLAND.

CINEMATOGRAPH-MACHINE.

1,168,992.  Specification of Letters Patent.  Patented Jan. 18, 1916.

Application filed September 11, 1914. Serial No. 861,233.

*To all whom it may concern:*

Be it known that I, WALTER HILLIER ANDERSON, a subject of the King of Great Britain and Ireland, and residing at the Hampden Residential Club, Phoenix street, London, N. W., England, have invented certain new and useful Improvements in and Relating to Cinematograph-Machines, of which the following is a specification.

This invention relates to cinematographic apparatus and more particularly to the connection between the sprocket wheel housing and the automatic action of a safety shutter. In such a device the gate is of the type in which it slides in parallel guides to and from the sprocket wheel, while a bell crank lever is controlled by the film to prevent the operation of an electric contact whereby the safety shutter is brought into use.

The invention consists in providing upon the sliding gate of a sprocket wheel an arm which is arranged to co-act with one arm of a bell-crank lever so that on the opening of the gate the other arm of the bell crank lever is prevented from closing an electric circuit which operates a safety shutter.

Further, the invention provides a novel means by which the said bell-crank lever co-acts with means on the gate whereby should there be a breakage or running off of the film during the working of the apparatus the safety shutter will be brought into use.

The accompanying drawings illustrate by way of example one modification of carrying the invention into effect, in which—

Figure 1:
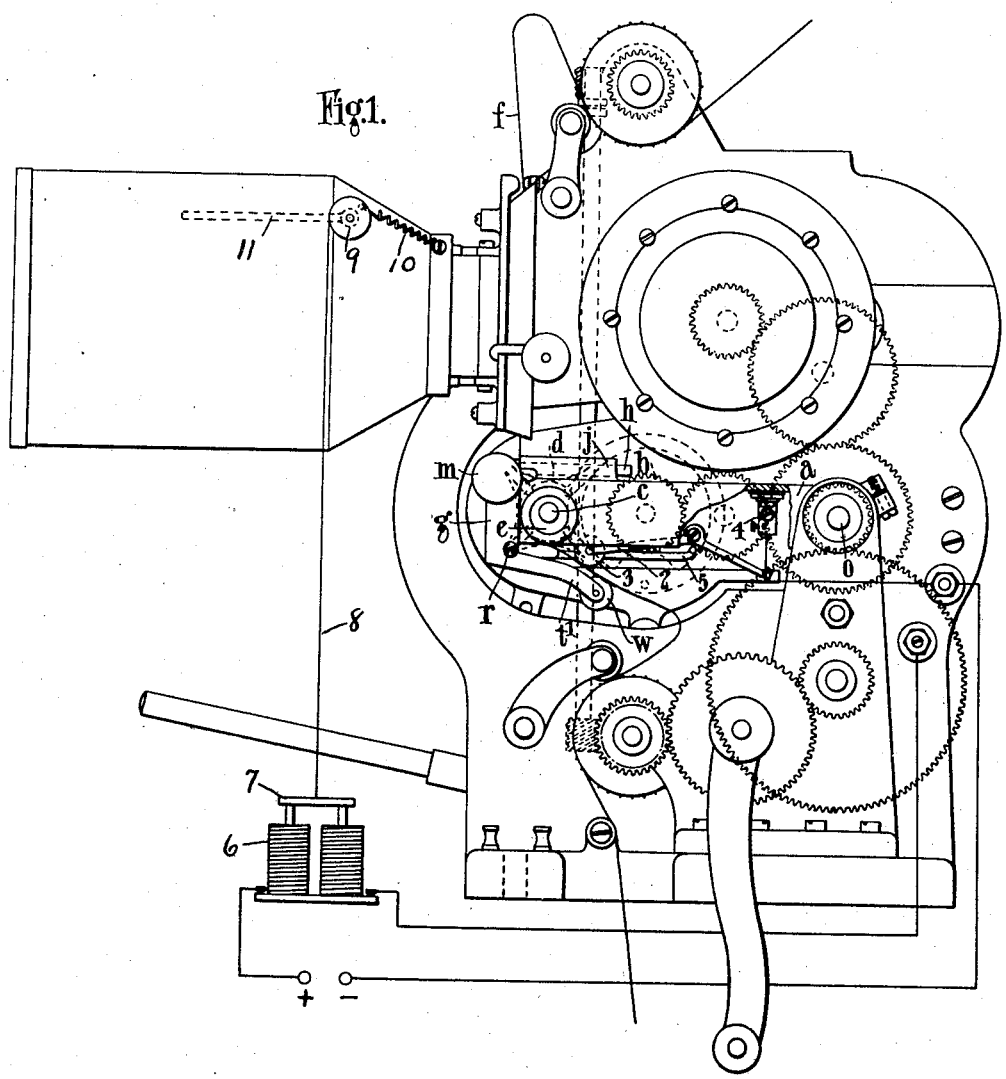
Figure 2:
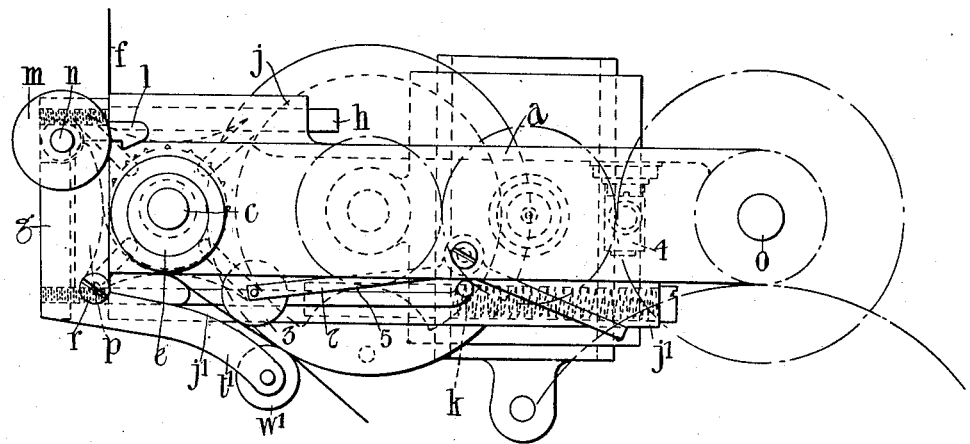
Figure 3:
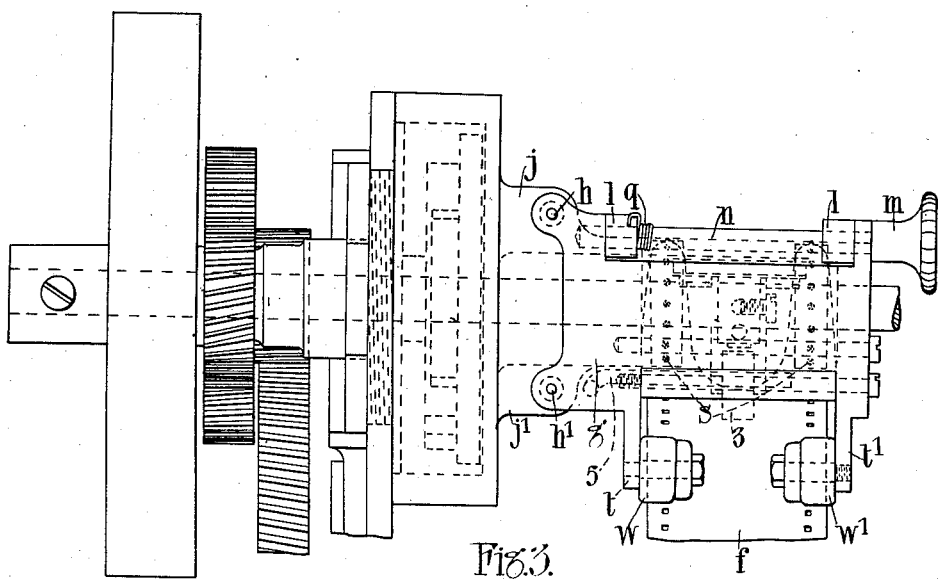

Figure 1 is a side elevation of a cinematograph apparatus embodying the invention, Fig. 2 is a side elevation of the sprocket housing, Fig. 3 an end elevation, and Fig. 4 a plan.

In the illustrations $a$ represents a hollow casing or cradle adapted for carrying the intermediate sprocket wheel. It is open at the left hand end, see Figs. 2 and 4, and can oscillate at the opposite end about the axis $o$. The spindle passing through this axis carries the gear wheel which transmits its motion to the wheel $b$ upon the arbor of which is fixed the cam driving the Maltese cross centered at $c$. The arbor $c$ also carries the intermediate sprocket wheel $d$ and is supported in an eccentric bearing $e$ for the purpose of regulating the adjustment between the Maltese cross and the cam. The sprocket wheel $d$ comprises a pair of pin wheels connected by an intermediate shaft, and being overhung the film $f$ can be quickly placed into position on the sprocket. In front of the sprocket wheel is arranged a gate $g$ which is guided by two runners $h, h'$ preferably arranged at the top and bottom of the gate on the side remote from the operator, the runners sliding in the bosses $j$ and $j'$ which form part of the casing $a$. The lower boss contains a helical spring $k$ which is under compression when the gate is in its closed position. On a short spindle $n$ at the top of the gate are pivoted two hooks or pawls $l$, operated by the milled head screw $m$, a helical spring $q$ upon the spindle $n$ retaining the pawls in engagement with notches in the cradle. A shoe $p$ pivoted at $r$ projects in both directions embracing a portion of the sprocket wheel, grooves being cut in the shoe to allow the pins $s$ on the sprocket wheel to pass freely and carry around the film.

The lower portion of the gate $g$ has two horns or arms $t, t'$ carrying rollers $w, w'$ over which the film passes on its way to a lower draw-off sprocket. Upon a convenient part of the cradle $a$ is fulcrumed a bell crank lever 2, one arm being forked to carry a roller 3, the other arm forming a contact or switch for closing an electric circuit at the insulated terminal 4 which is also fixed on the cradle $a$. Secured to the gate is an arm 5 bent to the form shown so that it projects on the underside of the bell crank lever. The purpose of this arm 5 is to lock the bell crank lever to prevent the safety shutter being operated whenever the gate is opened.

The operation of the mechanism is as follows:—When the film $f$ is in position in the machine, it passes between the sprocket wheel $d$ and the shoe $p$ over the two rollers $w, w'$, under the roller 3 of the bell crank lever 2, and then over the two rollers $w$ and $w'$. The film when running normally thus keeps the switch arm of the bell crank lever from contacting with the insulated terminal or switch 4. To open the gate it is only necessary to turn the milled headed nut $m$ when the retaining catches $l$ on the gate are disengaged from the cradle, and the spring $k$ immediately expands and the gate automatically opens. The gate in its movement carries with it the arm 5 which bears upon the underside of the bell crank lever arm 2 raising the roller 3 from the film so that the latter may be easily placed in position. To reset the gate it is only necessary to push it toward the cradle *a* when the catches *l* which have sloping faces automatically engage in the notches on the cradle. Should the film break or run off the sprocket wheel then the roller 3 is free to fall, when the opposite end of the bell crank lever contacts with the terminal 4 thus closing the electric circuit +, —, of an electromagnet 6 whose armature 7 is attached by a cord 8 which passes over a pulley 9 and is secured through the medium of a spring 10 to the frame of the apparatus. The spindle which carries the pulley 9 is hinged to a convenient portion of the apparatus and has secured to it the safety shutter 11. On the circuit being closed by the contacting of the bell-crank lever with the terminal 4, the electro-magnet 6 is energized, the armature 7 is drawn in and the shutter 11 immediately closes and the film thereby prevented from becoming ignited. In the case of the other sprocket wheels, the cage or cradle instead of being pivoted is usually secured direct on to the frame of the machine.

Having now described my invention, what I claim as new and desire to secure by Letters Patent is:—

1. A cinematographic apparatus comprising a machine frame, a film, a film sprocket wheel, a sliding gate, a bell crank lever, an insulated terminal upon the frame, a safety shutter, an electro-magnet, an electric circuit connecting with the electro-magnet and the terminal, and connecting means between said shutter and the electro-magnet in combination with horns on the said gate, rollers on the said horns over which the film passes, a roller on one arm of the bell crank lever which rests upon the film, and means on the gate whereby when the gate is opened the said means locks the bell crank lever preventing the other arm from contacting with the terminal.

2. A cinematographic apparatus comprising a machine frame, a film, a film sprocket wheel, a casing or cradle carrying said sprocket wheel, parallel bosses on the cradle, a sliding gate, runners on the gate sliding in said bosses, a helical spring adapted to open the gate, a spindle pivoted to the gate, hooks or pawls mounted on the spindle engaging notches on the cradle, a shoe hinged on the gate partially embracing the sprocket wheel and having grooves coincident with the pins on the sprocket wheel, a milled head on spindle, a helical spring surrounding the spindle, horns on the gate, rollers on the said horns, over which the film passes, a bell crank lever pivoted on the cradle, a roller on one arm of said lever, an insulated terminal or switch on the frame, an arm secured to the gate, a safety shutter, an electro-magnet, an electric circuit connecting with the electro-magnet and the terminal, and connecting means between said shutter and the electro-magnet whereby when the gate is opened the said arm locks the bell crank lever preventing the other arm from contacting with the terminal.

3. A cinematographic apparatus comprising a machine frame, a film, a film sprocket wheel, a casing or cradle carrying said sprocket wheel, parallel bosses on the cradle, a sliding gate, runners on the gate sliding in said bosses, a helical spring adapted to open the gate, a spindle pivoted to the gate, hooks or pawls mounted on the spindle engaging notches on the cradle, a shoe hinged on the gate partially embracing the sprocket wheel and having grooves coincident with the pins on the sprocket wheel, a milled head on spindle, a helical spring surrounding the spindle, horns on the gate, rollers on the said horns over which the film passes, a bell crank lever pivoted on the cradle, a roller on one arm of said lever, an insulated terminal or switch on the frame, an arm secured to the gate, a safety shutter, an electro-magnet connected thereto, an electric circuit connecting with the electro-magnet and the terminal whereby should the film break or run off the sprocket wheel the bell crank lever contacts with the terminal and the safety shutter is automatically closed.

In testimony whereof I have signed my name to this specification in the presence of two subscribing witnesses.

WALTER HILLIER ANDERSON.

Witnesses:
E. E. PUTLAND,
F. A. OUTHWAITE.

Copies of this patent may be obtained for five cents each, by addressing the "Commissioner of Patents, Washington, D. C."